United States Patent

[11] 3,599,270

| | | | | |
|---|---|---|---|---|
| [72] | Inventor | Yoichi Mori Yokohama, Japan | | |
| [21] | Appl. No. | 8,526 | | |
| [22] | Filed | Feb. 4, 1970 | | |
| [45] | Patented | Aug. 17, 1971 | | |
| [73] | Assignee | Nissan Motor Company, Limited Yokohama, Japan | | |
| [32] | Priority | Feb. 7, 1969 | | |
| [33] | | Japan | | |
| [31] | | 44/8771 | | |

[54] WINDSHIELD WIPER
4 Claims, 6 Drawing Figs.

[52] U.S. Cl. .................................................. 15/250.23,
[51] Int. Cl. ................................................... A471 1/00, B60s 1/02
[50] Field of Search .......................................... 15/250.13, 250.21, 250.23, 250.3

[56] References Cited
UNITED STATES PATENTS

| | | | |
|---|---|---|---|
| 1,964,109 | 6/1934 | Cusset.......................... | 15/250.23 |
| 2,326,231 | 8/1943 | Kraemer....................... | 15/250.23 |
| 2,607,065 | 8/1952 | Dahlgren...................... | 15/250.23 X |
| 2,738,536 | 3/1956 | Spencer, Jr................... | 15/250.23 |

*Primary Examiner*—Peter Feldman
*Attorney*—John Lezdey

ABSTRACT: A vehicle windshield wiper assembly of a quadric chain mechanism type, having a wiper blade adapted for sweeping practically the total area of the windshield by oscillating along a horizontal, nearly trochoidal path and maintaining a position perpendicular or nearly perpendicular to the horizontal line throughout the sweeps. The nearly trochoidal curve along which the centerpoint of the wiper blade moves is drawn by using a rotatable crank arm and a rotatable guide arm which are hingedly connected by a rod. The wiper blade is held in a position perpendicular or nearly perpendicular to the horizontal line by a rod held parallel to the crank arm and a linkage structure formed by the wiper arm and three connected rods.

WINDSHIELD WIPER

This invention relates to a windshield wiper assembly of a vehicle and more particularly to a windshield wiper assembly of the quadric linkage type having a wiper blade oscillating along a horizontal path maintaining a position perpendicular to the horizontal line throughout the sweeps.

The wiper blade of the conventional windshield wiper assembly moves semicircularly or semiarcuately on the windshield and therefore cannot sweep the upper right and left corners nor the upper center of the windshield, thus limiting the field clearly visible to the operator of the vehicle during rain and snowfalls.

A parallel linkage type windshield wiper assembly has been proposed with the wiper blades moving along a horizontal straight line on the windshield. This conventional windshield wiper of a parallel linkage type uses a straight guide member, and blades moving parallel along the guide member. Such prior art mechanism requires the use of a wire for drawing the blades or a linearly moving device such as a linearly moving motor as an actuating mechanism for moving the blades. Provision of such wire or linearly moving motor results in rough movement of the wiper blades as compared with semicircularly or semiarcuately moving wiper blades. In order to avoid jerks, a device has been proposed to move the wiper blade horizontally along a true trochoidal path by converting a circular movement into quasilinear but the device to realize such design concept is complicated in construction and expensive.

In order to eliminate this and other drawbacks of the known windshield wiper, the present invention proposes to construct a windshield wiper assembly with a horizontally moving wiper blade which comprises a quadric chain mechanism in lieu of a true trochoidal mechanism. The quadric linkage is intended to move the end of the wiper arm on a near-linear portion of a pseudo-trochoidal curve and to hold the wiper blade in a position substantially perpendicular to a horizontal line and, when the blade approaches the outboard limit of the windshield, to gradually incline the blade from the perpendicular position to a position parallel with the edge of the windshield.

The mechanism as heretofore proposed to move the wiper blade along a true trochoidal curve is arranged in such a manner that, when a crank arm rotates counterclockwise an angle of $m\theta$, a wiper arm provided at the periphery of the crank rotates clockwise an angle of $\theta$. In order to move the peripheral tip of the wiper arm along an approximately straight line, the following equation should hold:

$$R' = (\cos m\theta - 1)/(\cos \theta - 1) \quad (1)$$

where $R'$ is the ratio of the wiper arm length to the crank arm length.

For example, if $m=2$ and $\theta=50°$, then $R'=3.286$.

In a windshield wiper assembly of a quadric linkage type the value of $m$ is related to the value of $\theta$ and is not constant. However, since the value of $\theta$ is relatively small, the value of $m$ can be considered to be approximately constant with negligible deviations from the average.

Figure 1:
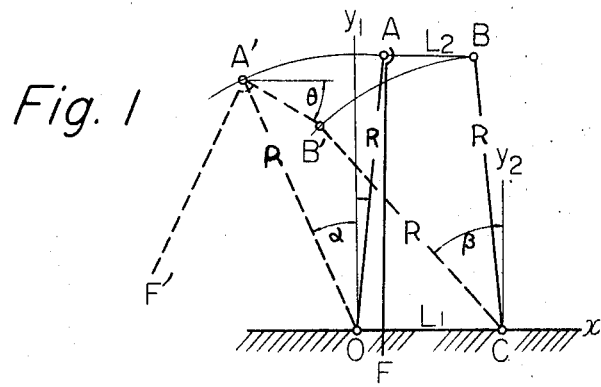
FIG. 1 shows the principle or movement of the quadric linkage mechanism of the wiper assembly according to the invention.

The principle of drawing a nearly straight portion of a pseudo- or semitrochoidal curve according to the present invention is illustrated in FIG. 1. The line A-O represents an oscillating crank arm and the line B-C a guide arm, both being of length R. The points O and C represent pivotal connections about which the lines A-O and B-C, respectively, may rotate and they are on the $x$ axis a fixed distance $L_1$ apart from each other. The points A and B are connected by a line A-B of the length $L_2$ representing a link arm. These points A and B also represent pivotal connections. The thus formed linkage O-A-B-C forms a quadric chain mechanism. The line A-F represents a windshield wiper arm which is perpendicular to the line A-B (in fact, when constructing the assembly of the present invention, the linkage B-A-F may be made of a unitary L-shaped piece, as will be described hereinafter) and when the line A-O is rotated about the fixed point O, the quadric linkage system O-A-B-C rotates accordingly. The new position of the assembly is shown by the broken lines O-A'-B'-C and the new position of the wiper arm A-F by A'-F'. The angles formed are as follows: between A'-O and vertical $y_1$ axis is $\alpha$, between B'-C and vertical $y_2$ axis is $\beta$, and between A'-B' and horizontal $x$ axis is $\theta$. The relationship therebetween is now expressed by equations:

$$R \cdot \cos \alpha - L_2 \cdot \sin \theta - R \cdot \cos \beta = 0 \quad (2)$$

$$L_1 + R \cdot \sin \alpha - L_2 \cdot \cos \theta - R \cdot \sin \beta = 0 \quad (3)$$

and if $L_1/R = L_1'$ and $L_2/R = L_2'$ or if $R=1$, the following equations are derived:

$$\cos \beta = \cos \alpha - L_2' \cdot \sin \theta. \quad (4)$$

$$\sin \beta = \sin \alpha - L_2' \cdot \cos \theta + L_1'. \quad (5)$$

Since $\cos^2\beta + \sin^2\beta = 1$, from the equations (4) and (5) the following equation is obtained:

$$L_1'^2 + L_2'^2 = 2L_2' \cdot \sin(\alpha+\theta) - 2L_1' \cdot \sin \alpha + 2L_1' \cdot L_2' \cdot \cos \theta. \quad (6)$$

Then, if $\theta=0$ and $\alpha=\alpha_o$ ($\alpha_o$ is smaller than zero), the equation (6) is converted to:

$$\sin \alpha_o = -(L_1' - L_2')/2. \quad (7)$$

Now, if $\alpha - \alpha_o = \gamma$ the equation (6) converts into:

$$L_1'^2 + L_2'^2 = 2L_2' \cdot \sin(\gamma+\theta+\alpha_o) - 2L' \cdot \sin(\gamma+\alpha_o) + 2L_1 \cdot L_2' \cdot \cos \theta,$$

where $\gamma$ the angle corresponds with the angle of rotation $m\theta$ in the equation (1).

If approximate calculations are made in which $\cos \alpha_o = 1$ and $\sin \theta$ and $\cos \theta$ are expanded to $\theta^4$ and if $L_1' - L_2' = \delta$, then the following equation is obtained:

$$(12 \cdot m^2\theta - m^4 \cdot \theta^3)\delta^2 + [48 \cdot m - 12 \cdot L_2' \cdot \{(m+1)^2 - m^2 - 2\}$$
$$\cdot \theta - 8 \cdot m^3 \cdot \theta^2 + L_2' \cdot \{(m+1)^4 - m^4 - 2\} \cdot \theta^3] \cdot \delta - 48 \cdot L_2' +$$
$$24 \cdot L_2^2 \cdot \theta + 8 \cdot \{(m+1)^2 - m^3\} \cdot L_2' \cdot \theta^2 + 2 \cdot L_2 \cdot \theta^3 = 0$$

$$(8)$$

If the value of $\theta$ is very small, $\theta^3$ is negligible so that the following equation is derived:

$$3 \cdot m^2\theta \cdot \delta^2 + [12 \cdot m - 3L_2' \cdot \{(m+1)^2 - m^2 - 2\} \cdot \theta + 2m^3 \cdot \theta^2]$$
$$\cdot \delta - 12 \cdot L_2' + 6 \cdot L_2^2 \cdot \theta + 2 \cdot \{m+1)^3 - m^3\} \cdot L_2' \cdot \theta^2 = 0$$

$$(9)$$

This means that while the value of $m$ is constant regardless of the value of $\theta$ in and case of a true trochoidal movement, the value $m$ varies in respect to $\theta$ according to equation (9) in a quadrilateral movement. (9)

Figure 2:
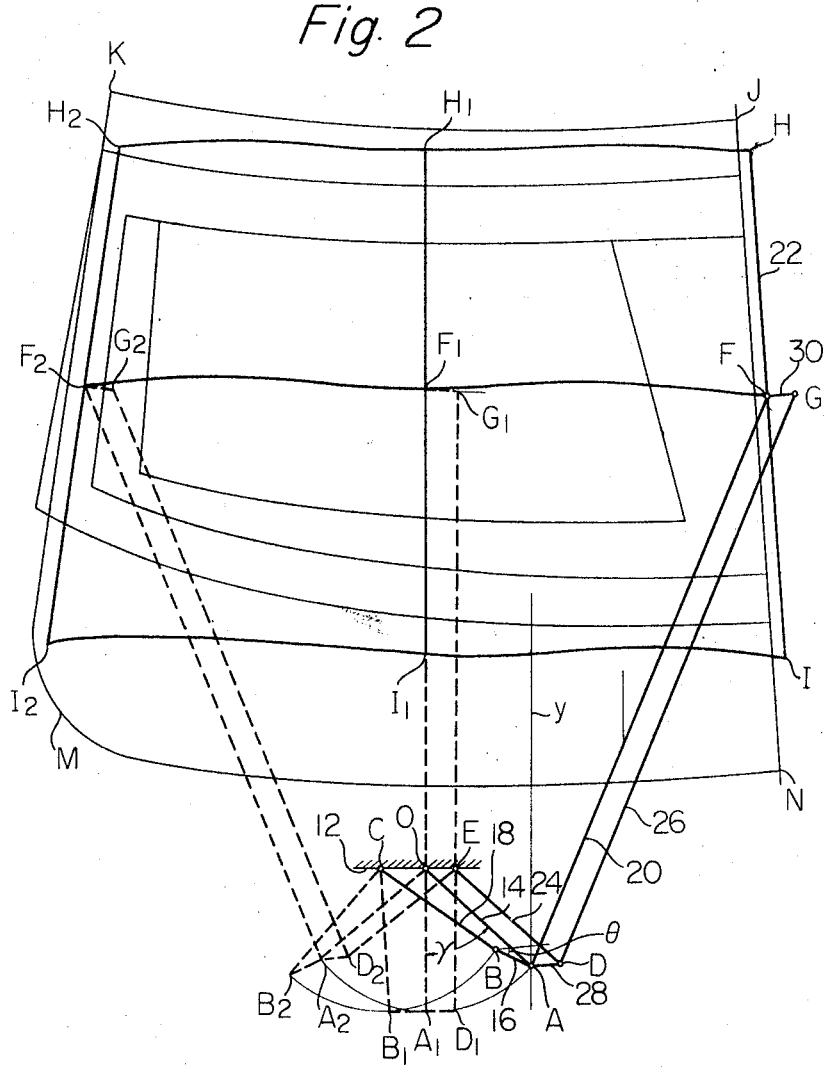
FIG. 2 is a front view schematically showing the movements of a windshield wiper assembly constructed according to the principle shown in FIG. 1, across the right half of the windshield.

In constructing a windshield wiper assembly according to the present invention, the distance $L_1$ between the points O and C in FIGS. 1 and 2 should be determined by calculating the value of $\delta$. If $\theta=0$ in the equation (9), then $\delta=L_1'$, and if the value of $\theta$ is relatively large, the value of $\delta$ is obtained from a graph drawn through points calculated using the equation (9) as a basis. If $m=2$ and $L_2'=0.25$, the values of $\delta$ corresponding to various values of $\theta$, which are expressed in fractions of the radian, are calculated with the following results:

| Values of θ | Corresponding values of δ |
| --- | --- |
| 0 | 0.125 |
| 0.1 | 0.119 |
| 0.2 | 0.104 |
| 0.3 | 0.0811 |
| 0.4 | 0.0513 |

As the value of $\theta$ approaches 0.4 radians, the value of $\delta$ falls sharply and the locus of the point $F'$ in FIG. 1, corresponding to the peripheral tip of the windshield wiper arm A–F, deviates from a nearly straight portion of a semitrochoidal curve. If the value of $\delta$ is given, the value of $m$ varies in relation to the value of $\theta$. However, since the value of $\theta$ varies only slightly in the wiper assembly and $L_2'$ is small, the variation of $m$ is also small. For practical purposes the length of the wiper arm may be approximated as $R'=m^2$ instead of $R'=3.286$ in true trochoidal movements.

FIG. 2 shows schematically one preferred embodiment of a quadric linkage type windshield wiper assembly according to the present invention. The operation as seen from the front will be described only for the right half of the windshield since the left half is a mirror picture of the right half. In this example, the angle $\theta=23°$, $m=2$, $R=1$, $L_2=0.25$ and the length of the wiper arm $R'=4.25$. The contour of the right half of the windshield is identified by J–K–M–N, wherein J–N indicates the centerline of the windshield. The points O, C and E form a straight horizontal line and represent the pivotal connections about which the lines A–O, B–C and D–E, respectively, oscillate. A base plate 12 supports a shaft and pins constituting the pivotal connections as will be described hereinafter. The line A–O represents a crank arm 14, the line A–B represents an auxiliary guide arm 16 and the line B–C represents a main guide arm 18, the line A–F a wiper arm 20 which is perpendicularly secured to the auxiliary guide arm 16. The wiper arm 20 is operatively connected to a wiper blade 22.

The line D–E represents a parallel crank arm 24, which parallel with and equal in length to the crank arm 14, the line D–G an auxiliary wiper arm 26, and the line A–D a connecting crank arm 28, parallel with and equal in length to the distance between the points O and E. The wiper blade 22 is replaceably fastened by any conventional means to a connecting rod 30 linking the terminal points F and G of the wiper arm 20 and auxiliary wiper arm 26, respectively. The wiper blade 30 is shown to terminate at points I and J and is parallel to the centerline J–N. The arm 28 pivotally connects the crank arm 14 to the arm 24 and at the same time the wiper arm 20 to the arm 26 at the points A and D. If this mechanical linkage A–D–G–F is rotated about the fixed point A with the arm 28 maintained in a horizontal position, then the wiper blade 22 will move laterally along a semicircular or semiarcuate path, and will thus maintain its position substantially perpendicular to the horizontal line.

If, now, the linkage A–D–G–F is pivotally connected to the quadric chain mechanism O–A–B–C, described and shown in FIG. 1, at the point A and to the parallel crank arm 24 at the point D and rotated about the point O by the crank arm 14 at an angle $\gamma$ from the position O–A, then the arm 16 will rotate from the position A–B an angle $\theta$ from the horizontal line and accordingly the wiper arm 20 will also rotate an angle $\theta$, since the arm 16 is perpendicular to the wiper arm 20. If the angle $\theta$ is small and $L_2'$ is also small, then, according to the equation (9) the line $F-F_1$ drawn by the end point F of the wiper arm 20 will be a semitrochoidal substantially straight horizontal line. Oscillating continuously, the point F of the wiper arm 20, the upper tip H of the wiper blade 22, the lower tip I of the blade will draw semitrochoidal and substantially straight horizontal lines $F-F_1-F_2$, $H-H_1-H_2$ and $I-I_1-I_2$, respectively, as indicated broken lines. If the arm 28 and rod 30 are equal in length to each other, the pattern swept by the wiper blade 22 will be approximately square. However, if the rod 30 is shorter than the arm 28 and the length thereof is selected suitably, the wiper blade 22 will incline at the outboard sweep limit from the position perpendicular to the horizontal line and become parallel with the edge of the windshield K–M as illustrated in FIG. 2.

All members described above are drawn in solid lines in FIG. 2 when the wiper blade 22 is at its extreme limit at the centerline of the windshield and in broken lines when the same is in a position halfways of its sweep and when it has reached the extreme outboard limit.

Figure 3:
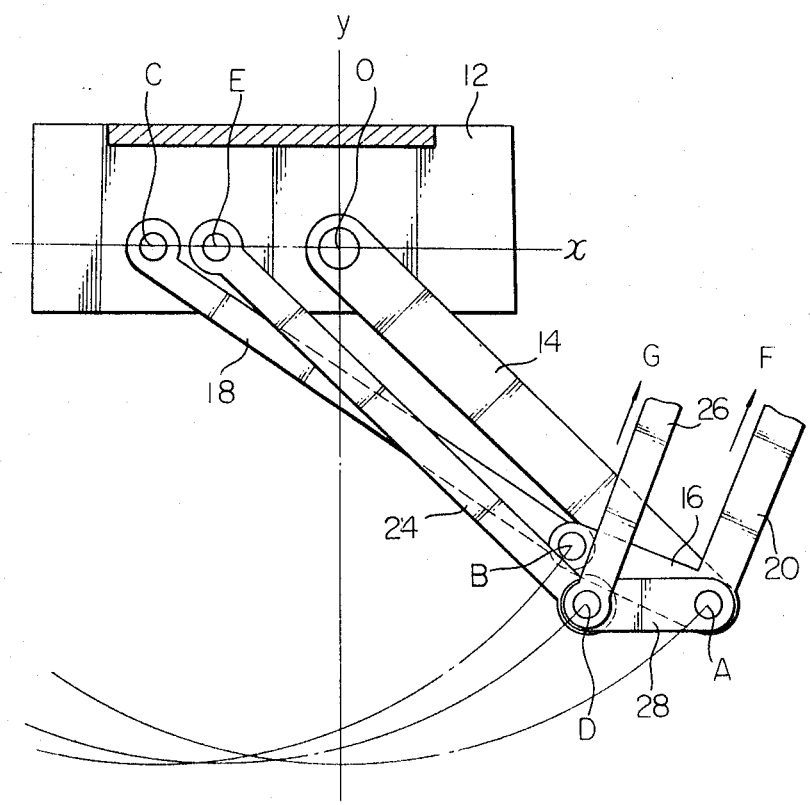
FIG 3 is a plan view showing the general arrangement of the principal arms of the wiper assembly shown in FIG. 2.

FIG. 3 shows, on an enlarged scale, the actual construction arrangement of the crank arm 14 in relation to the guide arm 18, wiper arm 20 and arms 16, 24, 26 and 28. Like members described in FIG. 2 are identified here by like numerals and letters. The wiper arm 20 and the arm 16 may form a unitary integral L-shaped piece to thus permanently maintain the wiper arm 20 at a right angle to the arm 16, as mentioned previously.

Figure 4:
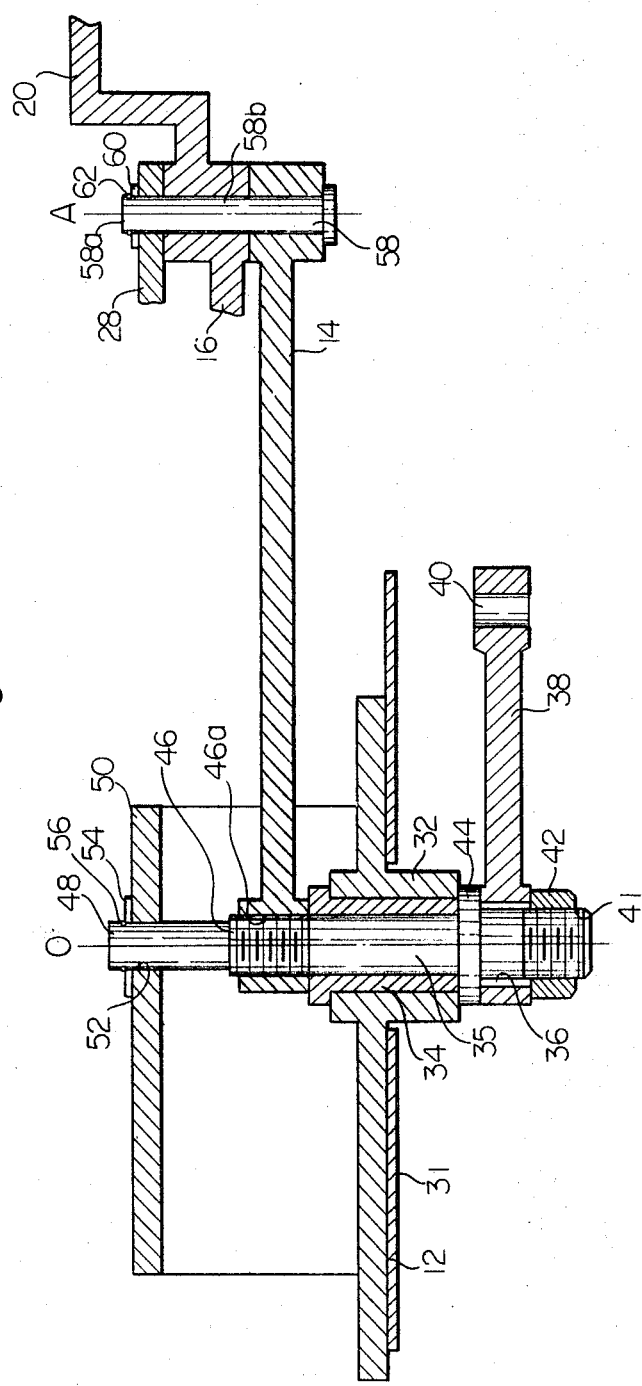
FIGS 4 and 5 are fragmentary sectional views of the wiper assembly taken on line A-O (FIG. 4) and lines A-B, A-D, and C-E (FIG. 5) in FIG. 3, taken at a different section.
Figure 5:
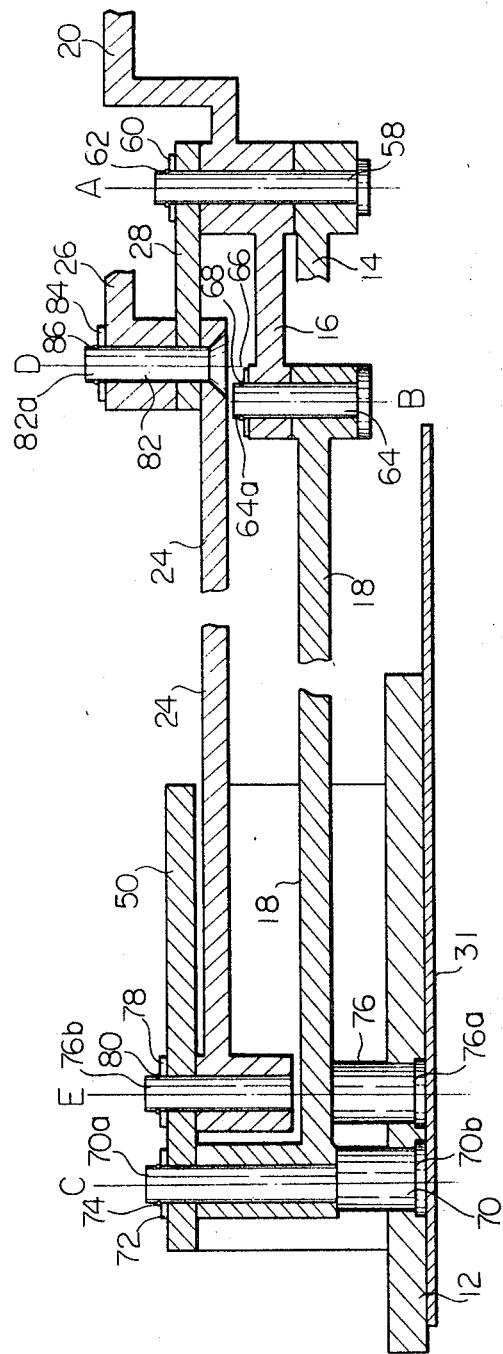

FIGS. 4 and 5 show in section principal parts of the quadric chain mechanism and the operating structure of windshield wiper assembly of the present invention. The assembly as shown is mounted on the base plate 12 and suitably fixed to the structure of the vehicle body 31. The base plate 12 forms a cylindrical boss 32 into which a fixed bearing 34 is fitted to facilitate the rotation of a crank arm shaft 35. The crank arm shaft 35 has a splined portion 36 with which an actuating lever 38 engages. The actuating lever 38 has an opening 40 for connection to a mechanism (not shown) which causes the actuating lever 38 and consequently the windshield wiper assembly to oscillate.

It will be understood that the descriptive designations "upper" and "lower" and similar terms to be used hereinafter refer to the drawings and not to the orientation of the shafts or other elements since the actual positioning thereof depends on the inclination of the windshield.

The crank arm shaft 35 in FIG. 4 is threaded at its lower end 41 to which a nut 42 fits to secure the actuating lever 38 between it and a flange portion 44 of the crank arm shaft 35. This shaft 35 is serrated externally in a portion 46 outside the bearing, fitting into the internally serrated portion 46a of the crank arm 14, connecting a wiper arm to a drive shaft. The upper end 48 of the crank arm shaft 35 is supported by a plate 50 with an opening 52 formed therein through which the upper end 48 of the shaft 35 projects and is held in place preferably with a washer 54 and a snapring 56. The axis of the crank arm shaft 35 corresponds to the point 0 in FIGS. 1, 2 and 3.

The crank arm 14 is pivotally connected at its peripheral end to wiper arm 20 and auxiliary guide arm 16 and to the connecting crank arm 28 by a flanged pin 58 at its upper end 58a and middle section 58b, respectively. The pin 58 is held in position with a washer 60 and a snapring 62 at its upper end 58a. The axis of the pin 58 corresponds to the point A in FIGS. 1, 2 and 3. Referring to FIG. 5, the arm 16 is pivotally connected to the guide arm 18 by a flanged pin 64 (the point B in FIGS. 1, 2 and 3) held in place at its upper end 64a with a washer 66 and a snapring 68. The guide arm 18 at its other end is pivotally connected to and supported by a flanged pin 70, (point C in FIGS. 1, 2 and 3) fixed to the base plate 12 at its lower end 70a and held in position at the upper end 70b by a washer 72 and a snapring 74, projecting through the support plate 50. The arm 24 is rotatably supported on a flanged pin 76 (the point E in FIGS. 1, 2 and 3) and is also fixed to the base plate 31 at its lower end 76a and held in position at the upper end by a washer 78 and a snapring 80, projecting through the support plate 50. The arms 26 and 28 are rotatably supported by pin 82 (the point D in FIGS. 1, 2 and 3) mounted on the peripheral end of the arm 24 and held in position at its upper end 82a by a washer 84 and a snapring 86. The arms 26 and 28 rotate independently of each other and also of the arm 24 about the pin 82. The peripheral or upper ends of the wiper arm 20 and the arm 26 are pivotally connected with the rod 30 as discussed previously. These pivotal connections by pins are similar to the one described for connecting the arm 16 to the guide arm 18 with the pin 64 in FIG. 5 but are not shown in detail and are identified only by the points F and G, respectively.

Figure 6:
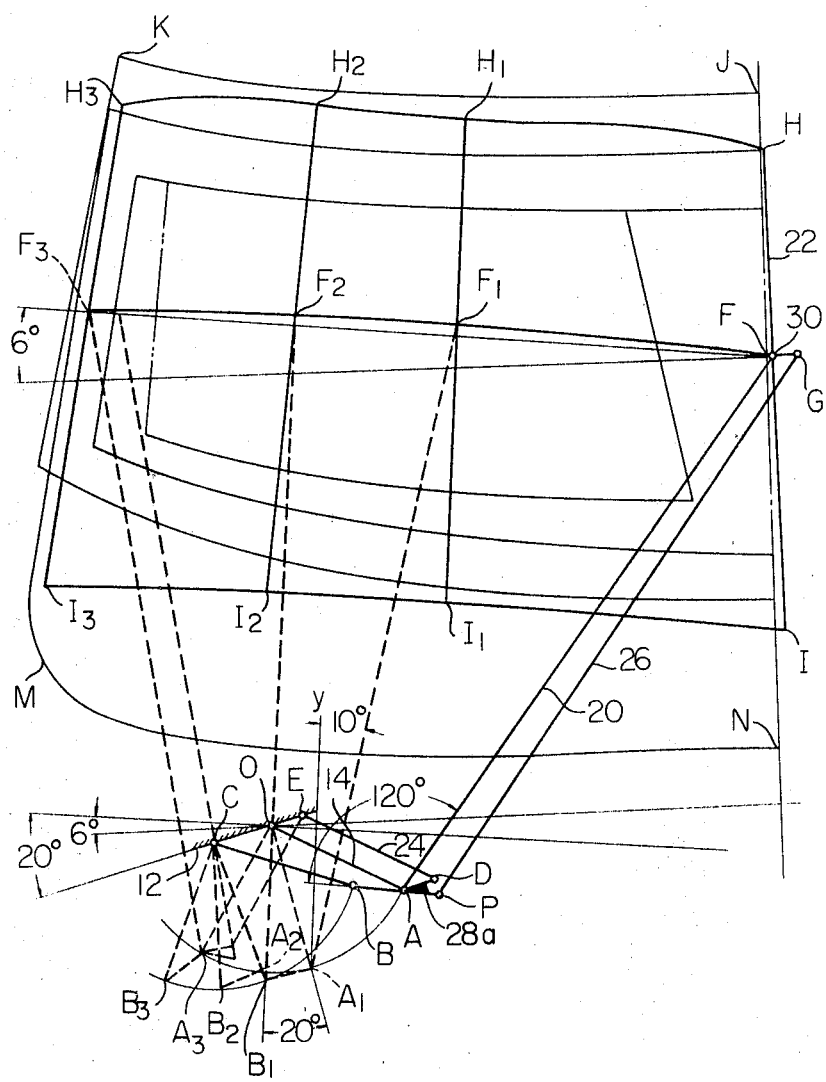
FIG. 6 is similar to FIG. 2 but shows the windshield wiper assembly of the present invention with the base line thereof inclined.

FIG. 6 shows a modified embodiment of the windshield wiper assembly of the quadric chain mechanism type according to the invention. In FIG. 6 like members are identified by like numerals and letters as in FIG. 2. In this embodiment the base line C–O–E is inclined relative to the horizontal line. The center point O is now positioned toward the edge of the windshield and a triangular member 28a, integral with the arm 28, is added, which has its pivotal points A and B corresponding to those of the arm 28 and point P. The triangular member 28a is pivotally connected by a flanged pin (not shown) with the arm 26 at the point P. The crank arm 14 and the arm 24 are pivotally connected with the triangular member 28a at the points A and D, respectively, similarly to the connections in the first embodiment. In this arrangement the lines $F–F_1–F_2–F_3$, $H–H_1–H_2–H_3$, $I–I_1–I_2–I_3$ drawn by the upper end of the wiper arm 20, the upper tip of the wiper blade 22 and the lower tip of the blade, respectively, are shown as inclined 6° and the base line 20° from the horizontal line. When the crank arm 14 moves from the line O–A to $O–A_1$ which is at a right angle to the base line C–O–E, it forms a 20° angle with the y-axis represented by line $O–F_2$ since the inclination of the base line C–O–E is 20°. Because $m=2$, the wiper arm moves to a position $A_1–F_1$ forming a 10° angle with the y-axis and the angle $OA_1F_1=30°$. The arm 16 moves from the line A–B to line $A_1–B_1$ which is parallel with C–O–C and accordingly the angle $OA_1B_1$ is 90° In this embodiment of the present invention the auxiliary guide arm 16 and the wiper arm 20 are two separate members, pivotally connected at the point A, forming an angle of 120° when the wiper blade is on the centerline of the windshield.

In the linkage O–A–D–E the lengths O–A (=D–E) and O–E (=A–D) and accordingly the length A–D is maintained at all times parallel with the line O–E and since the angle DAP of the triangle member is 20°, the line A–D is also kept at a 20° angle to the base line C–O–E and the horizontal line A–P.

As in the first embodiment described heretobefore, the link F–G may be shorter than the distance A–P, in which instance the wiper blade may assume a position $H_3–I_3$ which is parallel and close to the edge K–M of the windshield when reaching the outboard limit of the sweep.

The windshield wiper assembly of this invention can be used in all vehicles requiring windshield wiping during rain and snowfalls. Should it be desirable to keep the wiper blade at rest horizontally along the lower edge of the windshield, the base plate 12 may be secured on a rotatable shaft, operable from the interior of the vehicle and coaxial with the opening 40 of the actuating shaft 38. When the wiper blade has reached the outboard limit the assembly is stopped and the shaft with the base plate rotated clockwise (in FIGS. 2 and 6, but actually counterclockwise) approximately 90° thus keeping the wiper blade at rest horizontally along the lower edge of the windshield.

Having now described the present invention, it is understood, that by a rather simple mechanism the blade of a windshield wiper assembly may be moved horizontally across the windshield along a semitrochoidal path and with two such assemblies sweeping practically the total area of the windshield, enlarging the clearly visible field. The hazards otherwise caused by the limited sweep pattern of the convention semicircularly moving wiper blade are greatly reduced when driving in rain and snowfalls.

What I claim is:

1. A vehicle windshield wiper assembly for substantially horizontally sweeping the windshield of a vehicle comprising a main crank arm supported at one end on a base member through a pivotal connection connected fixedly to and rotated by a driving source, said base member being rigidly mounted on a vehicle body structure, a main guide arm supported at one end on said base member through a pivotal connection at a distance from said pivotal connection of said main crank arm, an auxiliary guide arm connected at both ends with the other ends of said main crank arm and main guide arm through pivotal connections, a parallel crank arm supported at one end on said base member through a pivotal connection, said parallel crank arm being identical in length with said main crank arm, a connecting crank arm connected at one end with said main crank arm and auxiliary guide arm through said pivotal connection connecting the main crank arm with the auxiliary guide arm and at the other with said parallel crank arm through a pivotal connection, the length of said connecting crank arm being equal to the distance between said main crank arm and parallel crank arm, a min wiper arm integrally connected at one end with said auxiliary guide arm at a substantially right angle thereto, the relative length R' of said wiper arm being approximately equal to $m^2$ where $m$ is a ratio of the angle of rotation of said main crank arm to the angle of rotation of said wiper arm in an opposite direction, a wiper blade rotatably connected at its substantially middle portion with said main wiper arm, an auxiliary wiper arm connected at one end with said parallel crank arm and connecting crank arm through said pivotal connection connecting the parallel crank arm with said connecting crank arm, said auxiliary wiper arm being identical in length with said main wiper arm, and a connecting rod connected integrally with said wiper blade at said substantially middle portion and at a right angle thereto, said connecting rod being substantially shorter than said connecting crank arm, said wiper blade being positioned, when the same reaches the side limits of the pattern to be swept thereby, substantially parallel to said side limits.

2. An assembly according to claim 1, wherein said pivotal connections through which said main crank arm, main guide arm and parallel arm are supported on said base member are located on a line substantially parallel to a line traced by the outer tip of said wiper blade.

3. An assembly according to claim 1, wherein said pivotal connections through which said main crank arm, main guide arm and parallel arm are supported on said base member are located on a line inclined with respect to a line traced by the outer tip of said wiper blade.

4. An assembly accordingly to claim 3, wherein said main wiper arm is connected with said parallel crank arm through a pivotal connection formed in a triangular member integral with said connecting crank arm, the angle of said triangular member defined by said connecting crank arm and a line connecting the last named pivotal, connection and said pivotal connection between said main crank arm and connecting crank arm being equal to an angle at which said line inclined with respect to a line traced by the outer tip of said wiper blade.